United States Patent
Tanaka et al.

(10) Patent No.: US 11,090,613 B2
(45) Date of Patent: Aug. 17, 2021

(54) COMPOSITE SEMIPERMEABLE MEMBRANE AND METHOD FOR PRODUCING COMPOSITE SEMIPERMEABLE MEMBRANE

(71) Applicant: TORAY INDUSTRIES, INC., Tokyo (JP)

(72) Inventors: Hiroaki Tanaka, Shiga (JP); Hiroki Minehara, Shiga (JP); Koji Nakatsuji, Ehime (JP); Masahiro Kimura, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 16/063,172

(22) PCT Filed: Dec. 16, 2016

(86) PCT No.: PCT/JP2016/087628
§ 371 (c)(1),
(2) Date: Jun. 15, 2018

(87) PCT Pub. No.: WO2017/104824
PCT Pub. Date: Jun. 22, 2017

(65) Prior Publication Data
US 2018/0369758 A1 Dec. 27, 2018

(30) Foreign Application Priority Data
Dec. 18, 2015 (JP) .............................. JP2015-247002

(51) Int. Cl.
| | | |
|---|---|---|
| *B01D 69/02* | (2006.01) | |
| *C02F 1/44* | (2006.01) | |
| *B01D 69/10* | (2006.01) | |
| *B01D 67/00* | (2006.01) | |
| *C02F 103/08* | (2006.01) | |
| *B01D 69/12* | (2006.01) | |
| *B01D 71/56* | (2006.01) | |

(52) U.S. Cl.
CPC ......... *B01D 69/02* (2013.01); *B01D 67/0006* (2013.01); *B01D 69/10* (2013.01); *C02F 1/44* (2013.01); *B01D 67/0093* (2013.01); *B01D 69/125* (2013.01); *B01D 71/56* (2013.01); *B01D 2323/30* (2013.01); *B01D 2323/40* (2013.01); *B01D 2325/02* (2013.01); *B01D 2325/20* (2013.01); *C02F 2103/08* (2013.01); *Y02A 20/131* (2018.01)

(58) Field of Classification Search
None
See application file for complete search history.

(56) References Cited

U.S. PATENT DOCUMENTS

| | | | | |
|---|---|---|---|---|
| 5,733,602 A | * | 3/1998 | Hirose ................. | B01D 69/125 |
| | | | | 427/245 |
| 5,753,014 A | * | 5/1998 | Van Rijn ............ | B01D 39/1692 |
| | | | | 55/524 |
| 2008/0000843 A1 | | 1/2008 | Sasaki et al. | |
| 2012/0261332 A1 | | 10/2012 | Takagi et al. | |
| 2013/0256215 A1 | * | 10/2013 | Nakatsuji ............... | B01D 69/02 |
| | | | | 210/500.33 |
| 2014/0034569 A1 | | 2/2014 | Yoo et al. | |
| 2014/0287156 A1 | * | 9/2014 | Kreiter ................... | B01D 71/70 |
| | | | | 427/536 |
| 2015/0068963 A1 | | 3/2015 | Yoo et al. | |

FOREIGN PATENT DOCUMENTS

| | | |
|---|---|---|
| CN | 102665883 A | 9/2012 |
| JP | 8-224452 A | 9/1996 |
| JP | 10-174852 A | 6/1998 |
| JP | 2008-519673 A | 6/2008 |
| JP | 2008-260009 A | 10/2008 |
| JP | 5205966 B2 | 6/2013 |
| JP | 2014-521499 A | 8/2014 |

OTHER PUBLICATIONS

International Search Report, issued in PCT/JP2016/087628, dated Jan. 24, 2017.
Written Opinion of the International Searching Authority, issued in PCT/JP2016/087628, dated Jan. 24, 2017.
Office Action issued in Japanese Patent Application No. 2017-517820 dated Dec. 8, 2020.
Chinese Office Action for Chinese Application No. 201680073610.1, dated Apr. 14, 2021, with English translation.
Chinese Office Action and Search Report for Chinese Application No. 201680073610.1, dated Aug. 11, 2020, with English translation.

* cited by examiner

*Primary Examiner* — Clare M Perrin
(74) *Attorney, Agent, or Firm* — Birch, Stewart, Kolasch & Birch, LLP

(57) ABSTRACT

This composite semipermeable membrane is provided with: a porous supporting membrane that comprises a base and a porous supporting layer; and a separating function layer that is provided on the porous supporting layer. With respect to this composite semipermeable membrane, the standard deviation of pore radius of the separating function layer as determined by positron annihilation lifetime measurement is 0.025 nm or less.

4 Claims, No Drawings

COMPOSITE SEMIPERMEABLE MEMBRANE AND METHOD FOR PRODUCING COMPOSITE SEMIPERMEABLE MEMBRANE

TECHNICAL FIELD

The present invention relates to a composite semipermeable membrane useful for selective separation of a liquid mixture. The composite semipermeable membrane obtained by the present invention can be suitably used for, e.g. desalination of seawater or brackish water.

BACKGROUND ART

With regard to mixture separation, there are various techniques for removing substances (e.g., salts) dissolved in a solvent (e.g., water). Utilization of membrane separation techniques as a process for saving energy and resources has been expanding in recent years. Examples of membranes usable in the membrane separation techniques include a microfiltration membrane, ultrafiltration membrane, nanofiltration membrane, and reverse osmosis membrane. These membranes are used when obtaining drinking water from, for example, seawater, brackish water, or water containing a harmful substance, and for producing industrial ultrapure water, wastewater treatments, recovery of valuables, etc.

Most of the currently commercially available reverse osmosis membranes and nanofiltration membranes are composite semipermeable membranes, which are divided into two types: one type has a gel layer and an active layer including a crosslinked polymer on a porous supporting membrane; and the other type has an active layer formed by polycondensing monomers on a porous supporting membrane. Among these, a composite semipermeable membrane obtained by coating a porous supporting membrane with a separation functional layer including a crosslinked polyamide obtained by polycondensation reaction of a polyfunctional amine and a polyfunctional acid halide is widely used as a separation membrane having high permeability and high selectively separating properties.

Patent Document 1 discloses a composite semipermeable membrane which is provided with a separation functional layer having an average pore radius in the range of 0.25 nm to 0.35 nm, as a membrane having a high salt removal ratio and a high boron removal ratio. Patent Document 2 discloses to the effect that a membrane, in which a ratio of pores having a size of 6 Å to 8 Å to the overall amount of pores is 30% or more, is excellent in both an initial permeate flux and a salt removal ratio.

BACKGROUND ART DOCUMENTS

Patent Documents

Patent Document 1: Japanese Patent No. 5205966
Patent Document 2: JP-T-2014-521499

SUMMARY OF THE INVENTION

Problems that the Invention is to Solve

An object of the present invention is to provide a composite semipermeable membrane having high fresh water productivity.

Means for Solving the Problems

In order to achieve the above object, the present invention has the following constitution.

[1] A composite semipermeable membrane, including:
a porous supporting membrane including a substrate and a porous support layer; and
a separation functional layer disposed on the porous support layer,
in which a standard deviation of a pore radius of the separation functional layer measured by a positron annihilation lifetime measurement is 0.025 nm or less.
[2] The composite semipermeable membrane according to [1], in which the standard deviation is 0.020 nm or less.
[3] The composite semipermeable membrane according to [1] or [2], including:
the porous supporting membrane including the substrate and the porous support layer; and
the separation functional layer disposed on the porous support layer,
in which when an average pore radius of the separation functional layer measured by the positron annihilation lifetime measurement is 0.15 nm or more, a relative standard deviation of the pore radius is 0.089 or less.
[4] The composite semipermeable membrane according to any one of [1] to [3], in which a difference between a maximum pore radius and a minimum pore radius of the separation functional layer measured by the positron annihilation lifetime measurement is 0.13 nm or less.
[5] The composite semipermeable membrane according to [1], [3] or [4], in which a pure water permeability coefficient A and an average pore radius R (nm), which is measured by the positron annihilation lifetime measurement, satisfy a relationship that $A/R^4$ is $2.8\times10^{-9}$ m/s/Pa/nm$^4$ to $4.7\times10^{-9}$ m/s/Pa/nm$^4$.
[6] The composite semipermeable membrane according to any one of [2] to [4], in which a pure water permeability coefficient A and an average pore radius R (nm), which is measured by the positron annihilation lifetime measurement, satisfy a relationship that $A/R^4$ is $1.2\times10^{-9}$ m/s/Pa/nm$^4$ to $5.1\times10^{-9}$ m/s/Pa/nm$^4$.
[7] The composite semipermeable membrane according to [5] or [6], including:
the porous supporting membrane including the substrate and a porous support layer; and
the separation functional layer disposed on the porous support layer,
in which a diffusion coefficient of water in the separation functional layer, which is equilibrated at a temperature of 25° C. and a relative humidity of 97.3% RH and measured by nuclear magnetic resonance method, converges to $10^{-11}$ m$^2$/sec or more by 400 msec.
[8] A method for producing a composite semipermeable membrane, the composite semipermeable membrane including a porous supporting membrane including a substrate and a porous support layer, and a separation functional layer disposed on the porous support layer, the method including a step of:
forming the separation functional layer on the porous support layer,
wherein the step includes substeps of:
bringing a polyfunctional amine solution into contact with a polyfunctional acid halide solution to form a polyamide layer on the porous support layer through an interfacial polycondensation reaction; and
adding a compound having an SP value of 7 to 15 (cal/cm$^3$)$^{1/2}$ to a reaction field of the interfacial polycondensation.
[9] The method for producing a composite semipermeable membrane according to [8], in which the compound having the SP value of 7 to 15 (cal/cm$^3$)$^{1/2}$ is added within 60 seconds after the contact between the polyfunctional amine solution and the polyfunctional acid halide solution starts.

[10] The method for producing a composite semipermeable membrane according to [8] or [9], further including steps of:

bringing the separation functional layer into contact with a compound (I) which reacts with a primary amino group to produce a diazonium salt or a derivative thereof, thereby forming the diazonium salt; and bringing the separation functional layer into contact with a water-soluble compound (II) having reactivity with the compound (I).

Advantages of the Invention

According to the present invention, it is possible to obtain a composite semipermeable membrane having high fresh water productivity.

MODE FOR CARRYING OUT THE INVENTION (1-1) Microporous Supporting Membrane

A microporous supporting membrane of the present invention has substantially no ability to separate ions or the like, and is intended to impart strength to the polyamide separation functional layer, which substantially has separation performance. Pore size or pore distribution of the microporous supporting membrane is not specifically limited, but for example, it is preferred to have uniform micropores or micropores which become gradually larger from a surface on a side where the polyamide separation functional layer is formed to a surface on the other side, and to have micropores with a size in range of 0.1 nm to 100 nm on the surface on the side where the polyamide separation functional layer is formed.

Material or shape of the microporous supporting membrane is not specifically limited, but a membrane obtained by forming a porous support on a substrate may be an example. Examples of substrate includes a fabric including at least one selected from polyester and aromatic polyamide as a main component.

As the fabric to be used as the substrate, a long-fiber nonwoven fabric and a short-fiber nonwoven fabric can both be preferably used. In particular, the long-fiber nonwoven fabric is more preferred since the substrate is required to have sufficient film-forming properties thereby preventing that a polymer solution reach a back surface due to excessive penetration when the polymer solution is poured on the substrate, the porous support delaminates from the substrate, or the membrane has unevenness or defects such as pin holes due to substrate fluffing or the like.

Examples of the long-fiber nonwoven fabric include a long-fiber nonwoven fabric formed of a thermoplastic continuous filament. The substrate constituted of the long-fiber nonwoven fabric can reduce unevenness or defects occurring upon pouring the polymer solution due to substrate fluffing, which is caused by the short-fiber nonwoven fabric. In addition, since tension is imposed on the substrate along a direction of membrane formation in continuous production of a composite semipermeable membrane, it is preferred to use a long-fiber nonwoven fabric for the substrate, which has better dimensional stability.

In particular, it is preferred that the fibers of the substrate on the side opposite to the porous support are longitudinally oriented with respect to the direction of membrane formation to maintain strength of the substrate to prevent membrane breakage. The term "longitudinally oriented" means that the fibers are oriented in parallel with the direction of membrane formation. On the other hand, when the fibers are oriented perpendicular to the direction of membrane formation, the fibers are "transversely oriented."

It is preferred that a degree of fiber orientation in the non-woven substrate is 0° to 25° on the side opposite to the porous support. The "degree of fiber orientation" as used herein refers to an index which indicates the directions of the fibers of a nonwoven fabric substrate constituting the supporting membrane. That term means an average angle of fibers constituting the nonwoven fabric substrate when the direction of membrane formation in continuous membrane formation is taken as 0° and the direction perpendicular to the membrane formation direction, i.e., the width direction of the nonwoven fabric substrate, is taken as 90°. Consequently, the closer the degree of fiber orientation to 0°, the more the fibers are longitudinally oriented; and the closer the degree of fiber orientation to 90°, the more the fibers are transversely oriented.

Steps for producing a composite semipermeable membrane or for producing an element include a step of heating. A phenomenon in which the supporting membrane or the composite semipermeable membrane shrinks occurs due to the heating. Especially in continuous membrane formation, the shrinkage likely occurs in the width direction, along which no tension is imposed. Since the shrinkage of the supporting membrane or the composite semipermeable membrane causes problems concerning dimensional stability, etc., substrates having a low degree of thermal dimensional change are desirable.

When the nonwoven fabric substrate has a difference in the degrees of fiber orientation between the fibers on the side opposite to the porous support and the fibers on the porous support side is 10° to 90°, changes along the width direction due to heating can be prevented and is hence preferred.

It is preferred that the substrate has air permeability of 2.0 cc/cm$^2$/sec or more. When the air permeability falls within such a range, a permeation amount of the composite semipermeable membrane increases. This is thought to be because, in a step for forming the supporting membrane, the inner structure of the porous support is changed due to increased non-solvent displacement rate from the substrate side when the polymer solution is poured on the substrate and the substrate is immersed in a coagulating bath, and the result exerts an influence on retention and diffusion velocity of the monomers in a subsequent step for forming the separation functional layer.

The air permeability can be measured by means of a Frazier type air permeability tester according to JIS L1096 (2010). For example, sample pieces of 200 mm×200 mm are cut out from the substrate. The sample pieces are mounted on the Frazier air permeability tester. The suction fan and the air holes are adjusted such that a pressure of the inclination barometer reaches 125 Pa. The amount of air passing through the substrate, i.e. air permeability is calculated based on the pressure indicated by the vertical barometer at this time and types of air holes used during measurement. KES-F8-AP1 Air Permeability Tester, manufactured by KATO TECH CO., LTD., can be adopted as the Frazier type air permeability tester.

The thickness of the substrate is preferably in the range of 10 μm to 200 μm, more preferably in the range of 30 μm to 120 μm.

Examples of a material of the porous support include homopolymers and copolymers such as polysulfones, polyethersulfones, polyamides, polyesters, cellulosic polymers, vinyl polymers, polyphenylene sulfide, polyphenylene sulfide sulfones, polyphenylene sulfones, and polyphenylene oxide. One of such polymers can be used alone, or a blend of two or more thereof can be used.

The cellulosic polymers including cellulose acetate and cellulose nitrate may be used. The vinyl polymers including polyethylene, polypropylene, polyvinyl chloride, and polyacrylonitrile may be used. Among these, homopolymers or copolymers such as polysulfones, polyamides, polyesters, cellulose acetate, cellulose nitrate, polyvinyl chloride, polyacrylonitrile, polyphenylene sulfide, and polyphenylene sulfide sulfones are preferred. Among these, polysulfones, cellulose acetate, and polyvinyl chloride or mixtures thereof are more preferably used. Of these materials, polysulfones are particularly preferably used because it is highly stable chemically, mechanically and thermally.

Specifically, the porous support preferably includes a polysulfone containing repeating units represented by the following chemical formula. The inclusion of this polysulfone renders pore diameter control easy and brings about high dimensional stability.

[Chem. 1]

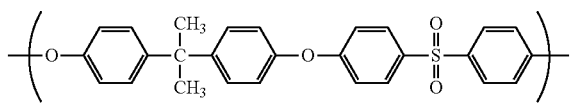

The thickness of the porous support is preferably within the range of 10 μm to 200 μm, more preferably within the range of 20 μm to 100 μm. With the porous support having the thickness of 10 μm or more, the excellent pressure resistance and the uniform supporting membrane without defects can be achieved, hence the composite semipermeable membrane with such a porous support shows the advantageously enhanced salt removal performance. With the porous support having the thickness of 200 μm or less, a residual amount of unreacted substances does not increase during the production, thus it is possible to prevent reduction in chemical resistance due to decreased permeation amount.

The thickness of the microporous supporting membrane obtained by forming the porous support on the substrate affects the strength of the composite semipermeable membrane and the packing density of the composite semipermeable membrane incorporated into an element. In order for the composite semipermeable membrane of the present invention to obtain sufficient mechanical strength and packing density, the thickness of the microporous supporting membrane is preferably within the range of 30 μm to 300 μm, more preferably within the range of 50 μm to 250 μm.

The shape of the microporous supporting membrane can be observed with scanning electron microscope, a transmission electron microscope or an interatomic microscope. For example, when the scanning electron microscope is used for observation, the porous support is removed from the substrate and freeze-fractured into sample pieces for cross-section observation. The sample pieces are thinly coated with platinum, platinum-palladium, or ruthenium tetrachloride, preferably with ruthenium tetrachloride, and observed by an ultra-high resolution field emission scanning electron microscope (UHR-FE-SEM) at an accelerating voltage of 3 kV to 6 kV. As the ultra-high resolution field emission scanning electron microscope, S-900 Electron Microscope, manufactured by Hitachi, can be used.

The microporous supporting membrane used in the present invention can be selected from "Millipore Filter VSWP" (trade name, manufactured by Millipore Corporation) or "Ultrafilter UK-10" (trade name, manufactured by Toyo Roshi Kaisha, Ltd.), and also can be prepared in accordance with a process described in "Office of Saline Water Research & Development Progress Report No. 359" (1968).

The thickness of the substrate, porous support, or composite semipermeable membrane can be measured by a digital thickness gauge. Since the polyamide separation functional layer (described below) is significantly thin compared with the microporous supporting membrane, the thickness of the composite semipermeable membrane can be considered as the thickness of the microporous supporting membrane. Therefore, it is possible to easily calculate the thickness of the porous support by measuring the thickness of the composite semipermeable membrane with the digital thickness gauge and subtracting the thickness of the substrate from the thickness of the composite semipermeable membrane. As the digital thickness gauge, PEACOCK, manufactured by OZAKI MFG. CO., LTD., can be used. When the digital thickness gauge is used, the average value is calculated by measuring the thickness at twenty locations.

The thickness of the substrate, porous support or composite semipermeable membrane may be measured by the microscopes described above. The thickness is measured from cross-sectional electron microscope images which are taken at arbitrary five locations of one sample piece. The average value is calculated to obtain the thickness. The "thickness" and "pore diameter" in the present invention mean average values thereof.

(1-2) Polyamide Separation Functional Layer

In the composite semipermeable membrane of the present invention, it is the polyamide separation functional layer that substantially has ability to separate ions or the like.

The polyamide separation functional layer of the present invention contains polyamide as a main component. The polyamide for constituting the separation functional layer can be formed by, for example, the interfacial polycondensation of a polyfunctional amine with a polyfunctional acid halide. At least one of the polyfunctional amine and the polyfunctional acid halide preferably includes a compound having a functionality of 3 or higher.

The polyamide separation functional layer usually has a thickness in the range of 0.01 μm to 1 μm, preferably in the range of 0.1 μm to 0.5 μm, to obtain sufficient separation performance and sufficient permeation amount.

The term "polyfunctional amine" means an amine that has at least two primary and/or secondary amino groups in a molecule, at least one of which is a primary amino group. Examples thereof include aromatic polyfunctional amines such as phenylenediamine in which the two amino groups have been bonded to the benzene ring at the ortho, meta, or para positions, xylylenediamine, 1,3,5-triaminobenzene, 1,2,4-triaminobenzene, 3,5-diaminobenzoic acid, 3-aminobenzylamine, and 4-aminobenzylamine, aliphatic amines such as ethylenediamine and propylenediamine, and alicyclic polyfunctional amines such as 1,2-diaminocyclohexane, 1,4-diaminocyclohexane, 4-aminopiperidine, and 4-aminoethylpiperazine.

Among these, when the selectively separating properties, permeability, and heat resistance of the membrane are taken into account, aromatic polyfunctional amines that each has two to four primary amino groups and/or secondary amino groups per molecule are preferred. Suitable examples of such polyfunctional aromatic amines include m-phenylenediamine, p-phenylenediamine, and 1,3,5-triaminobenzene. Because of availability and handleability, it is more preferred to use m-phenylenediamine (hereinafter referred to as m-PDA) among these. One of those polyfunctional amines may be used alone, or two or more thereof may be used in combination. When two or more polyfunctional amines are used in combination, two or more of the amines enumerated above may be used in combination, or any of the enumerated amines may be used in combination with an amine having at least two secondary amino groups per molecule. Examples of the amine having at least two secondary amino groups per molecule include piperazine and 1,3-bispiperidylpropane.

The term "polyfunctional acid halide" means an acid halide having at least two halogenated carbonyl groups per molecule. Examples of trifunctional acid halides include trimesoyl chloride, 1,3,5-cyclohexanetricarbonyl trichloride, and 1,2,4-cyclobutanetricarbonyl trichloride. Examples of bifunctional acid halides include aromatic bifunctional acid halides such as biphenyldicarbonyl dichloride, azobenzenedicarbonyl dichloride, terephthaloyl chloride, isophthaloyl chloride, and naphthalenedicarbonyl chloride, aliphatic bifunctional acid halides such as adipoyl chloride and sebacoyl chloride, and alicyclic bifunctional acid halides such as cyclopentanedicarbonyl dichloride, cyclohexanedicarbonyl dichloride, and tetrahydrofurandicarbonyl dichloride.

When reactivity with the polyfunctional amine is taken into account, the polyfunctional acid halide preferably is a polyfunctional acid chloride. When the selectively separating properties and heat resistance of the membrane are taken into account, the polyfunctional acid chloride more preferably is a polyfunctional aromatic acid chloride having two to four chlorocarbonyl groups per molecule. Because of availability and handleability, it is more preferred to use trimesoyl chloride. One of those polyfunctional acid halides may be used alone, or two or more thereof may be simultaneously used.

Furthermore, monofunctional acid halides or monohydrolyzed trimesoyl chloride may be used as an additive. Examples of such monofunctional acid halides include, for example, benzoyl fluoride, benzoyl chloride, benzoyl bromide, methanoyl fluoride, methanoyl chloride, methanoyl bromide, ethanoyl fluoride, ethanoyl chloride, ethanoyl bromide, propanoyl fluoride, propanoyl chloride, propanoyl bromide, propenoyl fluoride, propenoyl chloride, propenoyl bromide, butanoyl fluoride, butanoyl chloride, butanoyl bromide, butenoyl fluoride, butenoyl chloride, and butenoyl bromide. One of those additives may be used alone, or two or more thereof may be used in combination.

As a result of intensive investigations, the inventors of the present invention have found that when the standard deviation of the pore radius of the separation functional layer measured by the positron annihilation lifetime measurement is 0.025 nm or less, preferably 0.020 nm or less, a composite semipermeable membrane with the separation functional layer exhibits excellent fresh water productivity.

The positron annihilation lifetime measurement is a method of measuring the time period (several hundreds picoseconds to several tens of nanoseconds) from the time the positron enters the sample until it disappears, and based on the annihilation lifetime, a size (0.1 to 10 nm), a number density and a size distribution of the pores are non-destructively evaluated. Details of such a measurement are described in "The Fourth Series of Experimental Chemistry", Vol. 14, p. 485, The Chemical Society of Japan, Maruzen Co., Ltd. (1992).

The positron annihilation lifetime measurement is classified into two methods depending on the type of positron source. One is a 22Na method using a radioactive isotope (22Na), which is suitable for evaluating vacancies of resin, powder, fiber, liquid, and the like. The other one is a positron beam method using a positron beam emitted from an electron beam accelerator as a positron source, which is suitable for evaluation of vacancies for thin films having a thickness of about several hundred nm formed on various substrates. In particular, the latter positron beam method is more preferable as a measurement method of the separation functional layer of the composite semipermeable membrane. Because even when the composite semipermeable membrane is used as a measurement sample, it is possible to measure the separation functional layer only by maintaining the sample in a dry state, without specific processes such as separating the separation functional layer from the composite semipermeable membrane.

In the positron beam method, the measurement region in the depth direction from the sample surface is controlled by the energy amount of the positron beam incident on the sample. The higher the energy is, the deeper part from the sample surface is to be included in the measurement region. The depth depends on the sample density. When measuring the separation functional layer of the composite semipermeable membrane, if a positron beam having an energy of about 1 keV is irradiated, a region at a depth of 50 to 150 nm from the sample surface is usually measured. Furthermore, the central portion of the separation functional layer can be selectively measured for the separation functional layer having a thickness of about 150 to 300 nm.

Positrons and electrons bind with each other by Coulomb force to form a positronium (Ps) which is a neutral hydrogen-like atom. Examples of positroniums include para-positronium (p-Ps) and ortho-positronium (o-Ps) depending on whether the positron and electron spin are antiparallel or parallel. The two species are formed with a 1:3 ratio (determined by spin statistics). The average lifetime of each species is 125 ps for p-Ps and 140 ns for o-Ps. In an aggregated substance, o-Ps has a higher probability of overlapping with another electron than the electron to which it is bonded (phenomenon called "pickoff annihilation"), and as a result the average lifetime of o-Ps decreases to several ns. Annihilation of o-Ps in the insulating material is due to the overlapping of o-Ps and electrons present on the pore wall of the material, and thus the smaller the pore size is, the faster the disappearance rate becomes. That is, the annihilation lifetime $\tau$ of o-Ps can be associated to the size (diameter) of the pores present in the insulating material.

The annihilation lifetime r due to the aforementioned pickoff annihilation of o-Ps is calculated from the analysis result of the fourth component, which is obtained by dividing the positron annihilation lifetime curve measured by the positron annihilation lifetime measurement into four components with a nonlinear least squares program POSITRONFIT (see, e.g., P. Kierkegaard et al., Computer Physics Communications, Vol. 3, p. 240, North Holland Publishing Co. (1972) for details).

The average pore radius R in the separation functional layer of the composite semipermeable membrane according to the present invention is obtained from the following equation (1) based on the positron annihilation lifetime r described above. Equation (1) shows a relationship when assuming that o-Ps is present in the pore of radius R in the electronic layer with thickness $\Delta R$, and $\Delta R$ is empirically determined to be 0.166 nm (see Nakanishi et al., *Journal of Polymer Science, Part B: Polymer Physics*, Vol. 27, p. 1419, John Wiley & Sons, Inc. (1989) for details). In addition, the pore radius distribution for obtaining the standard deviation, the maximum value, and the minimum value of the pore radius was calculated from the aforementioned positron annihilation lifetime $\tau$ using a distribution analysis program CONTIN based on the inverse Laplace transformation.

[Equation 1]

$$\tau^{-1} = 2\left[1 - \frac{R}{R + \Delta R} + \frac{1}{2\pi}\sin\left(\frac{2\pi R}{R + \Delta R}\right)\right] \quad (1)$$

The standard deviation a of the pore radius in the separation functional layer of the composite semipermeable membrane of the present invention can be obtained by the following equation (2), assuming that the relative intensity (probability distribution) Xi at each pore radius Ri falls within the range of 0.18 nm to 1 nm, which is calculated by the positron annihilation measurement.

[Equation 2]

$$\sigma = \left\{\sum_{i=1}^{n} X_i (R - R_i)^2\right\}^{1/2} \quad (2)$$

Furthermore, in the composite semipermeable membrane of the present invention, when the average pore radius of the separation functional layer, which is measured by the positron annihilation lifetime measurement, is 0.15 nm or more, a relative standard deviation of the pore radius is preferably 0.089 or less. Since the radius of the water molecule is approximately 0.15 nm (see Kazuyoshi Murata, Kaoru Mitsuoka, Teruhisa Hirai, Thomas Walz, Peter Agrek, J. Bernard Heymann, Andreas Engel & Yoshinori Fujiyoshi (2000), *Structural Determinants of Waterpermeation through Aquaporin*-1. Nature, 407, 599-605, for details), it is possible to sufficiently permeate water by having an average pore radius greater than 0.15 nm. The larger the average pore radius is, the larger the deviation of the conventional pore radius becomes. It has been found that the relative standard deviation of the pore radius is 0.089 or less in the membrane which exhibits high permeability while having small deviation and high selective separability. Here, the relative standard deviation of the pore radius is a dimensionless value expressed by dividing the standard deviation a (nm) by the average pore radius R (nm).

Further, the inventors of the present invention have found that, when the standard deviation of the pore radius is 0.025 nm or less and the difference between the maximum value and the minimum value of the pore radius measured by the positron annihilation lifetime measurement is 0.13 nm or less, a membrane with particularly excellent high fresh water productivity can be obtained.

The maximum value and the minimum value of the pore radius mean the maximum pore radius and the minimum pore radius, respectively, in the range of 10% or more of the maximum relative intensity (probability distribution) in the pore radius distribution.

It was found that when the standard deviation is 0.025 nm or less, and the difference between the maximum value and the minimum value of the pore radius is 0.13 nm or less, the existence ratio of the effective pores through which only water passes is large, and the membrane having high fresh water productivity can be obtained.

The composite semipermeable membrane obtained by the present invention has high fresh water productivity. The pure water permeability coefficient A (m/s/Pa) is used as an indicator of the fresh water productivity of the membrane. Based on the Hagen-Poiseuille equation (see, e.g., Takehara Yukio, "Hydraulics", Corona Corporation, Oct. 10, 2012, p. 59 for details), the value of $A/R^4$ corresponds to an indicator relatively indicating the number of pores in the separation functional layer when the properties of fluid flowing in the pore of the pore radius R are the same.

In the composite semipermeable membrane obtained by the present invention, the pure water permeability coefficient A and the average pore radius R (nm), which is measured by a positron annihilation lifetime measurement, satisfy a relationship that $A/R^4$ is $1.2 \times 10^{-9}$ m/s/Pa/nm$^4$ to $5.1 \times 10^{-9}$ m/s/Pa/nm$^4$, preferably a relationship that $A/R^4$ is $2.8 \times 10^{-9}$ m/s/Pa/nm$^4$ to $4.7 \times 10^{-9}$ m/s/Pa/nm$^4$.

Since $A/R^4$ falls within such a range, it is apparent that the increase in the number of pores contributes to the improvement of the fresh water productivity. The composite semipermeable membrane obtained by the present invention is a membrane which exhibits high fresh water productivity by a small standard deviation of the pore radius and a large number of pores.

Diffusion coefficient of adsorbed water in the separation functional layer can be measured by stimulated echo in nuclear magnetic resonance (NMR). The stimulated echo is one of the basic methods of the diffusion coefficient measurement by NMR, which has characteristics that the signal intensity depends on the T1 relaxation time, and thus diffusion coefficient measurement can be carried out with good sensitivity for a sample with short T2. Exemplified measurement with the stimulated echo is referred to J. E. Tanner, *Journal of Chemical Physics*, vol. 52, No. 5, p. 2523 (1970). As the diffusion time is extended, the diffusion coefficient values converge. It is because the distance over which the water molecule moves in the membrane is extended, so that the unevenness of the membrane is averaged. The value of diffusion coefficient is estimated from signal attenuation, and the component with the lowest diffusion coefficient is assumed as adsorbed water. As the diffusion time required for the diffusion coefficient to be converged is shorter, the medium is considered as the more homogeneous medium in terms of water movement. The term "convergence" is defined as a time point when the difference in diffusion coefficient between different measurement values of continuous diffusion time becomes 5% or less.

(2) Production Method

An exemplified method for producing the composite semipermeable membrane of the present invention described above is explained next.

(2-1) Formation of Separation Functional Layer

The production method of this embodiment at least includes a step of forming a separation functional layer on a porous support layer. This step includes a substep of bring a polyfunctional amine solution into contact with a polyfunctional acid halide solution to form a polyamide layer on a porous support layer through an interfacial polycondensation reaction, and a substep of adding a compound having an SP value of 7 to 15 (cal/cm$^3$)$^{1/2}$ to a reaction field of the interfacial polycondensation.

Specifically, the step of forming a separation functional layer includes substeps of (i) bringing the porous support layer into contact with a polyfunctional amine solution; (ii) bringing a polyfunctional acid halide solution into contact with the membrane obtained in (i) to produce polyamide on the porous support layer through the interfacial polycondensation; (iii) adding a compound having an SP value of 7 to 15 (cal/cm$^3$)$^{1/2}$ to a reaction field during carrying out (ii).

Each production step will be described in detail below.

According to substeps (i) and (ii), an aqueous solution containing polyfunctional amine described above (hereinafter also referred to as an aqueous polyfunctional-amine solution) and an organic solvent solution containing polyfunctional acid halide, which is immiscible with water (hereinafter referred to as a polyfunctional acid halide solution) are brought into contact with each other, and interfacial polycondensation is carried out on a surface of the microporous supporting membrane, whereby polyamide can be produced.

The concentration of the polyfunctional amine in the aqueous polyfunctional amine solution is preferably within the range of 0.1 wt % to 20 wt %, more preferably within the range of 0.5 wt % to 15 wt %. When the concentration thereof is within that range, sufficient salt removal performance and sufficient permeability.

The aqueous polyfunctional-amine solution may contain a surfactant, organic solvent, alkaline compound, antioxidant, and the like so long as these components do not interfere with the reaction between the polyfunctional amine and the polyfunctional acid halide.

Examples of the surfactant include a compound having a polyoxyalkylene structure, a fatty acid ester structure or a hydroxyl group. Examples of the polyoxyalkylene structure include —(CH$_2$CH$_2$O)$_n$—, —(CH$_2$CH$_2$(CH$_3$)O)$_n$—, —(CH$_2$CH$_2$CH$_2$O)$_n$—, —(CH$_2$CH$_2$CH$_2$CH$_2$O)$_n$— and the like. Examples of the fatty acid ester structure include a fatty acid having a long chain aliphatic group. The long chain aliphatic group may be either linear or branched. Examples of the fatty acid include stearic acid, oleic acid, lauric acid, palmitic acid, and salts thereof. Fatty acid esters derived from fats and oils such as beef tallow, palm oil, coconut oil and the like can also be included. Examples of the surfactant having a sulfo group include 1-hexanesulfonic acid, 1-octanesulfonic acid, 1-decanesulfonic acid, 1-dodecanesulfonic acid, perfluorobutanesulfonic acid, toluenesulfonic acid, cumene sulfonic acid, octylbenzene sulfonic acid and the like. Examples of the surfactant having a hydroxyl group include ethylene glycol, propylene glycol, 1,3-propanediol, 1,4-butanediol, glycerin, sorbitol, glucose, sucrose and the like. Surfactants have effects of improving the wettability of the surface of the microporous supporting membrane and reducing the interfacial tension between the aqueous amine solution and the nonpolar solvent.

Examples of the organic solvent include a chain amide compound, a cyclic amide compound and the like. Examples of the chain amide compound include N-methylformamide, N,N-dimethylformamide, N,N,-dimethylacetamide, N,N-diethylformamide and N,N-diethylacetamide. Examples of the cyclic amide compound include N-methylpyrrolidinone, γ-butyrolactam, ε-caprolactam and the like. Some organic solvents act as a catalyst for the interfacial polycondensation reaction, and hence addition of an organic solvent sometimes enables the interfacial polycondensation reaction to be efficiently conducted.

Examples of the alkaline compound include hydroxides of alkali metals such as sodium hydroxide and potassium hydroxide; carbonates and bicarbonate inorganic compounds such as sodium carbonate, sodium hydrogencarbonate, potassium carbonate, potassium hydrogencarbonate and the like; and organic compounds such as tetramethylammonium hydroxide and tetraethylammonium hydroxide and the like.

Examples of the antioxidant include a phenol-based antioxidant, an amine-based antioxidant, a sulfur-based antioxidant, a phosphorus-based antioxidant, and the like. Examples of the phenol-based antioxidant (including a hindered phenol-based antioxidant) include 2,6-di-tert-butyl-4-methylphenol, 2,2'-methylene bis(4-ethyl-6-tert-butylphenol) and tetrakis-[methylene-3-(3',5'-di-tert-butyl-4'-hydroxyphenyl) propionate]methane and the like. Examples of the amine-based antioxidant include phenyl-β-naphthylamine, α-naphthylamine, N,N'-di-sec-butyl-p-phenylenediamine, phenothiazine, N,N'-diphenyl-p-phenylenediamine and the like. Examples of the sulfur-based antioxidant include dilauryl 3,3'-thiodipropionate, distearyl thiodipropionate, lauryl stearyl thiodipropionate, dimyristyl 3,3'-thiodipropionate and the like. Examples of the phosphorus-based antioxidant include triphenyl phosphite, octadecyl phosphite, trinonylphenyl phosphite and the like. Examples of other antioxidants include ascorbic acid or alkali metal salts thereof, sterically hindered phenol compounds such as dibutylhydroxytoluene and butylhydroxyanisole; isopropyl citrate; dl-α-tocopherol; nordihydroguaiaretic acid; propyl gallate and the like.

In order to perform the interfacial polycondensation on the microporous support layer, the aqueous solution of the polyfunctional amine described above is first brought into contact with the microporous supporting membrane. The contact with the surface of the microporous supporting membrane is preferably performed evenly and continuously. Specific examples include a method in which the aqueous polyfunctional-amine solution is applied to the microporous supporting membrane, the aqueous polyfunctional-amine solution is coated on the microporous supporting membrane and a method in which the microporous supporting membrane is immersed in the aqueous polyfunctional-amine solution. The time period during which the microporous supporting membrane is in contact with the aqueous polyfunctional-amine solution is preferably within the range of 1 to 10 minutes, more preferably within the range of 1 to 3 minutes.

After the aqueous polyfunctional-amine solution is brought into contact with the microporous supporting membrane, the excess aqueous solution is thoroughly removed so that no droplets remain on the membrane surface. By thoroughly removing the excess solution, it is possible to avoid degradation of the membrane performance caused by droplets remaining portions as membrane defects after the formation of a membrane. As a method for removing the excess solution, for example, a method in which the microporous supporting membrane which has been contacted with the aqueous polyfunctional-amine solution is held vertically to allow the excess aqueous solution to flow down naturally, as described in JP-A-2-78428, or a method in which streams of a gas, e.g., nitrogen, are blown against the microporous supporting membrane from air nozzles to forcedly remove the excess solution can be used. In addition, after the removal of the excess solution, the membrane surface may be dried to remove some of the water contained in the aqueous solution.

Subsequently, an organic-solvent solution containing a polyfunctional acid halide is brought into contact with the microporous supporting membrane which has been contacted with the aqueous polyfunctional-amine solution, thereby forming a skeleton of a crosslinked-polyamide separation functional layer through interfacial polycondensation.

The concentration of the polyfunctional acid halide in the organic-solvent solution is preferably within a range of 0.01 wt % to 10 wt %, more preferably within a range of 0.02 wt % to 2.0 wt %. When the concentration of the polyfunctional acid halide is 0.01 wt % or higher, a sufficiently high reaction rate is obtained. When the concentration thereof is 10 wt % or less, the occurrence of side reactions can be prevented. It is more preferred to incorporate an acylation catalyst such as DMF into the organic-solvent solution, because the interfacial polycondensation is accelerated.

The organic solvent preferably is water-immiscible, can dissolve the polyfunctional acid halide and does not damage the microporous supporting membrane, and may be any such solvent which is inert to both the polyfunctional amine compound and the polyfunctional acid halide. Preferred examples thereof include hydrocarbon compounds such as n-hexane, n-octane, n-decane, and the like.

A method for bringing the organic-solvent solution of polyfunctional acid halide into contact with the aqueous polyfunctional-amine compound solution phase may be carried out in the same manner as the aforementioned method for coating the aqueous polyfunctional-amine solution onto the microporous supporting membrane. In particular, a method for applying the solution on the porous support layer and a method for coating the porous support layer with the solution are suitable.

The temperature of the membrane surface immediately after the aqueous polyfunctional-amine solution and the polyfunctional acid halide solution are brought into contact with each other is preferably within the range of 25° C. to 60° C., more preferably within the range of 30° C. to 50° C. When the temperature is lower than 25° C., pleats do not become large and the permeation flux decreases. When the temperature is higher than 60° C., the removal ratio tends to decrease. By setting the temperature of the membrane surface immediately after the contact between the aqueous polyfunctional-amine solution and the polyfunctional acid halide solution within the range of 25° C. to 60° C., actual length of the separation functional layer per 1 μm length of the microporous supporting membrane can make 2 μm or more and 5 μm or less, and thus a high permeation flux and a high salt removal ratio can be achieved. For setting the temperature, the microporous supporting membrane may be heated, or a heated organic-solvent solution of polyfunctional acid halide may be brought into contact. The temperature of the membrane surface immediately after the aqueous polyfunctional-amine solution and the polyfunctional acid halide solution are brought into contact with each other can be measured with a non-contact thermometer such as a radiation thermometer.

After the separation functional layer containing crosslinked polyamide is thus formed on the microporous supporting membrane by bringing into contact with the organic solvent solution of polyfunctional acid halide to carry out the interfacial polycondensation, preferably, the excess solvent is removed. For removing the excess solvent, for example, a method in which the membrane is held vertically to allow the excess organic solvent to flow down naturally and be thus removed, can be used. In this case, the time period of vertically holding the membrane is preferably 1 minute to 5 minutes, more preferably 1 minute to 3 minutes. When the time period is too short, the separation functional layer will not be fully formed. When the time period is too long, the organic solvent will be overdried, the defects will be likely to occur and the performance tends to deteriorate.

By adding the compound having an SP value of 7 to 15 $(cal/cm^3)^{1/2}$ to the polycondensation reaction field in the substep (iii) during carrying out the substep (ii), the following effects are obtained.

During polyamide formation, amides of various molecular weights exist in the reaction field. When oligomers of amide having a small molecular weight aggregate with each other, the pore diameter tends to be nonuniform.

The SP value is a solubility parameter and is a value defined as $(\Delta H/V)^{1/2}$ $(cal/cm^3)^{1/2}$ based on the molar evaporation heat $\Delta H$ and the molar volume $V$ of the solution. A compound having an SP value in the range of 7 $(cal/cm^3)^{1/2}$ to 15 $(cal/cm^3)^{1/2}$ has high affinity with amide oligomers. Therefore, when such a compound is in the reaction field of amide polycondensation, aggregation between oligomers can be prevented by interaction between the oligomer having a small molecular weight and this compound. As a result, a membrane having a uniform pore diameter, i.e., a membrane having a small standard deviation of the pore diameter can be obtained.

Example of the compounds having the SP value of 7 to 15 $(cal/cm^3)^{1/2}$ include hydrocarbons, esters, ketones, amides, alcohols, ethers and the like. Considering the affinity with amide oligomers, alcohols and ethers are preferable, and further considering the affinity with a solvent used at the time of contact with the interfacial polymerization reaction field, alcohols having 3 or more carbon atoms, ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol butyl methyl ether, diethylene glycol isopropyl methyl ether, diethylene glycol butyl diacetate, diethylene glycol dibenzoate, diethylene glycol ethyl ether acetate, diethylene glycol butyl ether acetate, diethylene glycol bis(p-toluenesulfonic acid), diethylene glycol bis(3-aminopropyl)ether, 1,2-bis (2-aminoethoxy)ethane, dipropylene glycol dimethyl ether, tetraethylene glycol dimethyl ether, and tetraethylene glycol diethyl ether are particularly preferable.

The compound having the SP value of 7 to 15 $(cal/cm^3)^{1/2}$ is used as an organic solvent solution of 10 wt % or less, preferably 5 wt % or less. The organic solvent is one which, like the solvent used for the polyfunctional acid halide described above, does not damage the microporous supporting membrane, and may be any such solvent which is inert to the polyfunctional amine compound and polyfunctional acid halide. Preferred examples thereof include hydrocarbon compounds such as n-hexane, n-octane, n-decane, and the like.

For bringing the compound having the SP value of 7 to 15 $(cal/cm^3)^{1/2}$ into contact with the interfacial polymerization reaction field, the solution containing such a compound may be brought into contact with the support layer. The solution may be brought into contact in the same manner as the organic solvent solution of polyfunctional acid halide is brought into contact with the polyfunctional amine compound aqueous solution phase.

Addition of this compound (i.e., solution contact) is preferably carried out within 60 seconds or 45 seconds after the substep (ii) starts, that is, after the amide polycondensation starts. Hence the oligomer aggregation can be sufficiently prevented.

It is also preferable that this compound is added after the substep (ii) starts, that is, after the amide polycondensation starts. By adding the compound after the polycondensation started, disturbance of the reaction interface can be prevented, and as a result, a membrane having high water permeability can be obtained. In particular, it is preferable to add the compound after 5 seconds or more, or 10 seconds or more have passed from the start of the polycondensation.

After contact with the compound having the SP value of 7 to 15 $(cal/cm^3)^{1/2}$, it is preferable that the excess solution is removed in the same manner as described for the organic-solvent solution of polyfunctional acid halide.

(2-2) Formation of Porous Support Layer

The production method of this embodiment may include a step of forming a porous support layer. The substrate has already been exemplified.

The porous support layer may be formed by, for example, casting an N,N-dimethylformamide (hereinafter referred to as DMF) solution of the polysulfone on a substrate in a certain thickness, and by coagulating the cast solution by a wet process in water. In this way, a microporous supporting membrane can be obtained in which most of the surface has fine pores having a diameter of 10 nm or less.

(2-3) Other Treatments

For the composite semipermeable membrane obtained by the aforementioned method, if a step of hydrothermal treatment at 50° C. to 150° C., preferably 70° C. to 130° C. for 1 second to 10 minutes, preferably 1 minute to 8 minutes is added, it is possible to improve the removal performance and water permeability of the composite semipermeable membrane.

Furthermore, the composite semipermeable membrane of the present invention can further improve the salt removal ratio by inclusion of a step of bringing the membrane into contact with a compound (I) which reacts with a primary amino group on the separation functional layer to produce a diazonium salt or a derivative thereof after the hydrothermal treatment, and subsequently bringing the membrane into contact with a water-soluble compound (II) having reactivity with the compound (I).

Examples of the compound (I) which reacts with a primary amino group to be brought into contact to produce a diazonium salt or derivatives thereof include aqueous solutions of nitrous acid, a salt thereof, a nitrosyl compound and the like. Since the aqueous solution of nitrous acid or the nitrosyl compound easily generates a gas and easily decomposes, it is preferable to successively produce nitrous acid by, for example, a reaction between nitrite and an acidic solution. Generally, nitrite reacts with hydrogen ions to form nitrous acid ($HNO_2$). Nitrous acid is efficiently produced at pH of 7 or less, preferably 5 or less, more preferably 4 or less. Among them, the aqueous solution of sodium nitrite reacted with hydrochloric acid or sulfuric acid in an aqueous solution is particularly preferable for ease of handling.

The concentration of the compound (I), for example, sodium nitrite, which reacts with the primary amino group to produce a diazonium salt or derivatives thereof, is preferably within the range of 0.01 wt % to 1 wt %. By setting the concentration to fall within such a range, the effect of producing a sufficient diazonium salt or derivatives thereof can be obtained, and the solution can be easily handled.

The temperature of the compound is preferably 15° C. to 45° C. By setting the temperature to fall within such a range, the reaction does not take too much time, and decomposition of the nitrous acid is not too rapid, thus it is easy to handle.

The contact time with the compound is not limited as long as it is enough time to produce a diazonium salt and/or derivatives thereof. It can be processed in a short period of time at a high concentration, but more time is required when the concentration is low. Therefore, for the solution at the aforementioned concentration, contact time is preferably within 10 minutes, more preferably within 3 minutes. A method of contacting is not particularly limited. A solution of the compound may be applied (coated) or the composite semipermeable membrane may be immersed in a solution of the compound. For the solvent for dissolving the compound, any solvent may be used as far as the compound dissolves and the composite semipermeable membrane does not erode. Moreover, the solution may contain a surfactant, an acidic compound, an alkaline compound and the like as long as it does not interfere with the reaction between the primary amino group and the reagent.

Next, the composite semipermeable membrane in which the diazonium salt or derivatives thereof is produced is brought into contact with the water-soluble compound (II) which reacts with the diazonium salt or derivatives thereof. Examples of the water-soluble compound (II) which reacts with the diazonium salt or derivatives thereof include a chloride ion, bromide ion, cyanide ion, iodide ion, fluoroboric acid, hypophosphoric acid, sodium bisulfite, sulfurous acid ion, aromatic amines, phenols, hydrogen sulfide, thiocyanic acid and the like. When the membrane is reacted with sodium bisulfite and sulfurous acid ion, a substitution reaction occurs instantaneously, and an amino group is replaced with a sulfo group. Furthermore, by bringing the membrane into contact with an aromatic amine or a phenol, a diazo coupling reaction occurs and an aromatic group can be introduced to the membrane surface. These compounds may be used on its own or two or more in combination. The membrane may be brought into contact with different compounds multiple times. As the compound to be brought into contact, sodium hydrogensulfite and sulfurous acid ion are preferable.

The concentration and time, under which the membrane is brought into contact with the water-soluble compound (II) that reacts with the diazonium salt or derivatives thereof, can be appropriately adjusted in order to obtain the intended effect.

The temperature, at which the membrane is brought into contact with the water-soluble compound (II) that reacts with the diazonium salt or derivatives thereof, is preferably 10° C. to 90° C. By setting the temperature to fall within this temperature range, the reaction smoothly proceeds, and the permeation amount does not decrease due to the polymer shrinkage.

The membranes before and after being subjected to the treatments described in the section (2-3) are all referred to as the "composite semipermeable membrane," and layers on the support layer in the membranes before and after being subjected to the treatments in the section column (2-3) are all referred to as the "separation functional layer."

(3) Utilization of Composite Separation Membrane

The composite semipermeable membrane of the present invention thus produced can be suitably used as a spiral type composite-semipermeable-membrane element which is obtained by winding the composite semipermeable membrane around a cylindrical water collecting tube having many perforations, together with a raw-water channel member such as a plastic net and a permeate channel member such as tricot and optionally with a film for enhancing pressure resistance. In addition, such elements can be connected serially or in parallel and disposed in a pressure vessel, thereby configuring a composite-semipermeable-membrane module.

Furthermore, the composite semipermeable membrane, or its element or module can be combined with a pump for supplying raw water thereto, a device for pretreating the raw water, etc., thereby configuring a fluid separator. By using this separator, raw water can be separated into a permeate such as drinking water and a concentrate which has not passed through the membrane. Thus, water for an intended purpose can be obtained.

Higher operating pressures for the fluid separator improve the salt removal ratio, but result in an increase in the amount of energy necessary for the operation. Because of this and in view of the durability of the composite semipermeable membrane, the operating pressure at the time when water to be treated is passed through the composite semipermeable membrane is preferably 0.5 MPa to 10 MPa. Higher feed-water temperatures result in a decrease in salt removal ratio, whereas the membrane permeation flux decreases as the feed-water temperature declines. Thus, the temperature of the feed water is preferably 5° C. to 45° C. With respect to the pH of the feed water, high pH values may result in the occurrence of scales of magnesium and other substances in the case of high-salt-concentration feed water such as seawater. In addition, there is the fear of membrane deterioration due to high-pH operation. It is hence preferred to operate the fluid separator in a neutral region.

Examples of the raw water to be treated with the composite semipermeable membrane of the present invention include liquid mixtures containing salt (total dissolved solids) of 50 mg/L to 100 g/L, such as seawater, brackish water, and wastewater. In general, salt, which refers to an amount of the total dissolved solids, is expressed in "weight/volume" or is expressed in "weight ratio". According to a definition, it can be calculated from the weight of a residue remaining after a solution filtered through a 0.45-µm filter is vaporized at a temperature of 39.5° C. to 40.5° C. In a simpler way, practical salinity (S) is converted to salt.

EXAMPLES

The present invention will be explained below in more detail by reference to Examples, but the present invention is not limited by the following Examples in any way.

Measurements were carried out in Examples and Comparative Examples as follows.

<Salt Removal Ratio>

Seawater (with a salt concentration of about 3.5%) adjusted to have a temperature of 25° C. and a pH of 6.5 was supplied to the composite semipermeable membranes at an operating pressure of 5.5 MPa in Comparative Example 1 and Example 1. 500 mg/L of a sodium chloride solution adjusted to have a temperature of 25° C. and a pH of 6.5 was supplied to the composite semipermeable membranes at an operating pressure of 0.5 MPa in Comparative Examples 2 to 6 and Examples 2 to 4. For each case, the salt concentration in the permeated water was measured. The salt removal ratio of the membrane was obtained from the following equation:

Salt removal ratio (%)=100×{1−[(salt concentration in permeate)/(salt concentration in feed water)]}

<Membrane Permeation Flux>

The amount of the membrane permeate of the feed water (sodium chloride solution) was converted to permeate amount (m$^3$) per m$^2$ of the membrane area per day, which was represented as membrane permeation flux (m$^3$/m$^2$/day).

(Pure Water Permeability Coefficient)

The pure water permeability coefficient was calculated by the following equation.

Pure water permeability coefficient (m$^3$/m$^2$/sec/Pa)= (membrane permeation flux of solution)/(pressure difference on both sides of membrane−osmotic pressure difference on both sides of membrane × solute reflection coefficient) (a)

The solute reflection coefficient can be obtained as follows. First, the following equation is known as the transport equation of the reverse osmosis based on nonequilibrium thermodynamics.

$Jv=Lp(\Delta P-\sigma\cdot\Delta\pi)$ (b)

$Js=P(Cm-Cp)+(1-\sigma)C\cdot Jv$ (c)

in which Jv is the membrane permeation flux of the solution (m$^3$/m$^2$/s), Lp is the pure water permeation coefficient (m$^3$/m$^2$/s/Pa), ΔP is the pressure difference on both sides of the membrane (Pa), σ is the solute reflection coefficient, Δπ is the osmotic pressure difference on both sides of the membrane (Pa), Js is the membrane permeation flux of the solute (mol/m$^2$/s), P is the permeability coefficient of the solute (m/s), Cm is the membrane surface concentration of the solute (mol/m$^3$), Cp is the permeate concentration (mol/m$^3$), and C is the concentration on both sides of the membrane (mol/m$^3$). The average concentration C on both sides of the membrane has no substantial meaning when the concentration difference on both sides is excessively large, like the reverse osmosis membrane. Therefore, the following equation obtained by integrating the equation (a) with respect to the membrane thickness is often used:

$R=\sigma(1-F)/(1-\sigma F)$ (d), provided that $F=\exp\{-(1-\sigma)Jv/P\}$ (e), R is a true rejection rate, and is defined by:

$R=1-Cp/Cm$ (f).

Lp can be calculated from the equation (b) by changing ΔP variously. R is also measured by changing Jv variously. By performing curve fitting the equations (d) and (e) with respect to R plotted with 1/Jv, P and σ can be obtained simultaneously.

(Positron Annihilation Lifetime Measurement by Positron Beam)

Positron annihilation lifetime measurement of the separation functional layer in this example was carried out using a positron beam method as follows. That is, the separation functional layer was dried at room temperature under reduced pressure and cut into 1.5 cm×1.5 cm square to obtain test samples. Using a positron annihilation lifetime measurement apparatus equipped with a positron beam generating device for thin layer (this device is described in detail in *Radiation Physics and Chemistry*, 58, 603, Pergamon (2000)) at a beam intensity of 1 keV and room temperature under vacuum, test samples were measured by a barium difluoride scintillation counter using a photomultiplier tube with a total count of 5 million, and analyzed by POSITRONFIT. The average pore radius was calculated from the average lifetime τ of the fourth component obtained by analysis. Further, from the positron annihilation lifetime τ described above, the pore diameter distribution is calculated using the distribution analysis program CONTIN based on the inverse Laplace transformation. Based on the calculated pore diameter distribution, the difference between the maximum value and the minimum value of the pore radius, the standard deviation of pore radius and the relative standard deviation of pore radius were calculated.

(Diffusion Coefficient Measurement Method of Adsorbed Water in Separation Functional Layer by Nuclear Magnetic Resonance)

The separation functional layer was obtained by peeling the substrate of the composite semipermeable membrane, dissolving the support layer in an organic solvent, and drying and removing the organic solvent.

The separation functional layer precipitated in water was placed in the outer tube of the symmetrical microsample tube and the inner tube was carefully inserted and used for measurement. Prior to the measurement of the diffusion coefficient, the T1 and T2 relaxation times of the 1H signal were estimated, and the pulse repetition time was set to three times of T1. Measurement was carried out by changing the intensity of the magnetic field gradient from 22 G/cm to 400 G/cm using a magnetic field gradient pulse of 1 ms, from 20 ms to 1000 ms of diffusion time (Δ). Other measurement conditions were as follows.

<Measurement Conditions>

Apparatus: AVANCE III 400, manufactured by Bruker Corporation

Measurement: Stimulated echo

Measurement nuclear frequency: 400.3307 MHz (1H nucleus)

Spectral width: 8.01282 kHz

Pulse width: 10 μsec (90° pulse)

Observation point: 4096 data points: 65536

Reference substance: HOD (external reference: 4.79 ppm)

Temperature: 300K

In order to reduce the signal intensity of free water and to catch the slow signal of diffusion, the magnetic field gradient pulse with the intensity shown in Table 1 was used as the magnetic field gradient pulse.

TABLE 1

| Δ (ms) | Magnetic Field Gradient Pulse | | |
|---|---|---|---|
| | start | end | step |
| 20 | 140 | 400 | 32 |
| 30 | 130 | 320 | 32 |
| 40 | 120 | 280 | 32 |
| 60 | 90 | 240 | 32 |
| 80 | 80 | 220 | 32 |
| 100 | 70 | 190 | 32 |
| 150 | 58 | 160 | 32 |
| 200 | 50 | 140 | 32 |
| 250 | 45 | 120 | 32 |
| 300 | 40 | 110 | 32 |
| 400 | 35 | 100 | 32 |
| 500 | 32 | 90 | 32 |
| 600 | 30 | 85 | 32 |
| 800 | 25 | 75 | 32 |
| 1000 | 22 | 65 | 32 |

(Equilibration of Composite Semipermeable Membrane under Constant Temperature and Relative Humidity Conditions)

For adjustment of relative humidity under constant temperature condition, the saturated salt method described in JIS B 7920 is used. In particular, the conditions listed in Table 1 were adopted.

Approximately 200 mL of a saturated salt solution was placed in a container having a capacity of 2.7 L. 100 mg of the separation functional layer immersed in water was sealed in a wetted state in a manner not contacting with the saturated salt solution, and placed for 7 days in an incubator at 25° C.

TABLE 2

| | Relative Humidity (25° C.) | |
|---|---|---|
| Salt | % RH | Error |
| Potassium Sulfate | 97.3 | 0.5 |

Reference Example 1

15.7 wt % polysulfone DMF solution was cast on a polyester nonwoven fabric (air permeability: 0.51 cc/cm$^2$/sec to 1 cc/cm$^2$/sec) with a thickness of 200 μm at room temperature (25° C.), immediately immersed in pure water and left for 5 minutes to prepare a microporous supporting membrane (with a thickness of 210 to 215 μm).

Comparative Example 1

The porous supporting membrane obtained in Reference Example 1 was immersed in 5 wt % aqueous solution of m-phenylenediamine (m-PDA) for 2 minutes. The supporting membrane was slowly pulled up in the vertical direction. Nitrogen was blown from the air nozzle to remove excess aqueous solution from the supporting membrane surface. An n-decane solution containing 0.175 wt % of trimesoyl chloride (TMC) was applied at 45° C., so that the surface was completely wetted and left for 1 minute. Next, in order to remove excess solution from the membrane, the membrane was vertically held for 1 minute to remove the solution, and then washed with hot water at 90° C. for 2 minutes. Furthermore, the washed membrane was immersed in 0.3 wt % aqueous sodium nitrite solution of pH 3 at 35° C. for 1 minute and then immersed in 0.1 wt % aqueous sodium sulfite solution for 2 minutes to obtain a composite semipermeable membrane. Thereafter, the composite semipermeable membrane was washed with 90° C. hot water for 2 minutes. The difference between the maximum pore radius and the minimum pore radius in the positron annihilation lifetime measurement of the obtained composite semipermeable membrane was 0.138 nm.

Example 1

The porous supporting membrane obtained in Reference Example 1 was immersed in 5 wt % aqueous solution of m-PDA for 2 minutes. The supporting membrane was slowly pulled up from the aqueous solution in the vertical direction. Nitrogen was blown from the air nozzle to remove excess aqueous solution from the supporting membrane surface. An n-decane solution containing 0.175 wt % of trimesoyl chloride (TMC) was applied at 45° C., so that the support layer surface was completely wetted. After 10 seconds from the application, n-decane solution of 1 wt % diethylene glycol dimethyl ether was applied so that the support layer surface was completely wetted and left for 1 minute. Next, in order to remove excess solution from the membrane, the membrane was vertically held for 1 minute to remove the solution, and then washed with hot water at 90° C. for 2 minutes.

Furthermore, the washed membrane was immersed in 0.3 wt % aqueous sodium nitrite solution of pH 3 at 35° C. for 1 minute and then immersed in 0.1 wt % aqueous sodium sulfite solution for 2 minutes to obtain a composite semipermeable membrane. The difference between the maximum pore radius and the minimum pore radius in the positron annihilation lifetime measurement of the obtained composite semipermeable membrane was 0.113 nm.

Comparative Example 2

The microporous supporting membrane obtained in Reference Example 1 was immersed in 1.8 wt % aqueous solution of m-PDA for 2 minutes. The supporting membrane was slowly pulled up in the vertical direction. Nitrogen was blown from the air nozzle to remove excess aqueous solution from the supporting membrane surface. An n-decane solution containing 0.065 wt % of TMC was applied at 25° C. so that the support layer surface was completely wetted and left for 1 minute. Next, in order to remove excess solution from the membrane, the membrane was vertically held for 1 minute to remove the solution, and then washed with hot water at 90° C. for 2 minutes.

Furthermore, the washed membrane was immersed in 0.3 wt % aqueous sodium nitrite solution of pH 3 at 35° C. for 1 minute and then immersed in 0.1 wt % aqueous sodium sulfite solution for 2 minutes to obtain a composite semipermeable membrane. The difference between the maximum pore radius and the minimum pore radius in the positron annihilation lifetime measurement of the obtained composite semipermeable membrane was 0.143 nm.

Comparative Example 3

The microporous supporting membrane obtained in Reference Example 1 was immersed in 1.8 wt % aqueous solution of m-PDA for 2 minutes. The supporting membrane was slowly pulled up in the vertical direction. Nitrogen was blown from the air nozzle to remove excess aqueous solution from the supporting membrane surface. An n-decane solution containing 0.065 wt % of TMC and 1 wt % of diethylene glycol dimethyl ether was applied at 25° C. so that the support layer surface was completely wetted and left for 1 minute. Next, in order to remove excess solution from the membrane, the membrane was vertically held for 1 minute to remove the solution, and then washed with hot water at 80° C. for 2 minutes.

Furthermore, the washed membrane was immersed in 0.3 wt % aqueous sodium nitrite solution of pH 3 at 35° C. for 1 minute and then immersed in 0.1 wt % aqueous sodium sulfite solution for 2 minutes to obtain a composite semipermeable membrane.

Comparative Example 4

The composite semipermeable membrane obtained in Comparative Example 2 was immersed in 15 wt % aqueous solution of glycerin for 30 seconds, excessive aqueous solution was removed from the membrane and then the membrane was dried by hot air at 50° C. for 70 seconds to obtain a dried composite semipermeable membrane. The difference between the maximum pore radius and the minimum pore radius in the positron annihilation lifetime measurement of the obtained composite semipermeable membrane was 0.152 nm.

Comparative Example 5

A composite semipermeable membrane was obtained in the same manner as in Comparative Example 2 except that an n-decane solution containing 0.01 wt % of benzoyl chloride and 0.065 wt % of TMC at 25° C. was used. The difference between the maximum pore radius and the minimum pore radius in the positron annihilation lifetime measurement of the obtained composite semipermeable membrane was 0.147 nm.

Comparative Example 6

A composite semipermeable membrane was obtained in the same manner as in Comparative Example 2 except that an n-decane solution containing 0.06 wt % of monohydrolyzed TMC and 0.065 wt % of TMC at 25° C. was used. The difference between the maximum pore radius and the minimum pore radius in the positron annihilation lifetime measurement of the obtained composite semipermeable membrane was 0.139 nm.

Example 2

The microporous supporting membrane obtained in Reference Example 1 was immersed in 1.8 wt % aqueous solution of m-PDA for 2 minutes. The supporting membrane was slowly pulled up in the vertical direction. Nitrogen was blown from the air nozzle to remove excess aqueous solution from the supporting membrane surface. An n-decane solution containing 0.065 wt % of trimesoyl chloride (TMC) was applied at 25° C. so that the support layer surface was completely wetted. After 10 seconds from the application, n-decane solution of 1 wt % diethylene glycol dimethyl ether was applied so that the support layer surface was completely wetted and left for 1 minute. Next, in order to remove excess solution from the membrane, the membrane was vertically held for 1 minute to remove the solution, and then washed with hot water at 80° C. for 2 minutes.

Furthermore, the washed membrane was immersed in 0.3 wt % aqueous sodium nitrite solution of pH 3 at 35° C. for 1 minute and then immersed in 0.1 wt % aqueous sodium sulfite solution for 2 minutes to obtain a composite semipermeable membrane. The difference between the maximum pore radius and the minimum pore radius in the positron annihilation lifetime measurement of the obtained composite semipermeable membrane was 0.120 nm.

Example 3

A composite semipermeable membrane was obtained in the same manner as in Example 2, except that n-decane solution of 1 wt % diethylene glycol dimethyl ether was applied 30 seconds after n-decane solution containing 0.065 wt % of TMC was applied in Example 2. The difference between the maximum pore radius and the minimum pore radius in the positron annihilation lifetime measurement of the obtained composite semipermeable membrane was 0.120 nm.

Example 4

A composite semipermeable membrane was obtained in the same manner as in Example 2 except that a compound in n-decane of Example 2 was replaced by diethylene glycol diacetate. The difference between the maximum pore radius and the minimum pore radius in the positron annihilation lifetime measurement of the obtained composite semipermeable membrane was 0.081 nm.

Example 5

A composite semipermeable membrane was obtained in the same manner as in Example 4 except that it was not brought into contact with an aqueous sodium nitrite solution and an aqueous sodium sulfite solution. The difference between the maximum pore radius and the minimum pore radius in the positron annihilation lifetime measurement of the obtained composite semipermeable membrane was 0.105 nm.

The average pore radius, the standard deviation of the pore radius, the relative standard deviation of the pore radius, the diffusion coefficient of the adsorbed water and the time to convergence of the composite permeable membranes obtained in Comparative Examples 1 to 3 and Examples 1 to 5, which were measured by the positron annihilation lifetime measurement, were the values listed in Table 3.

TABLE 3

| | m-PDA Concentration (wt %) | TMC Concentration (wt %) | (1) Compound with SP value of 7 to 15 (cal/cm3)1/2 | Time from Applying n-decane solution of TMC to Applying n-decane Solution of (1) | Average Pore Radius R (mm) | Standard Deviation of Pore Radius (mm) |
|---|---|---|---|---|---|---|
| Comparative Example 1 | 5 | 0.175 | — | — | 0.23 | 0.027 |
| Example 1 | | | diethylene glycol dimethyl ether | 10 | 0.25 | 0.015 |
| Comparative Example 2 | 1.8 | 0.065 | — | — | 0.33 | 0.031 |
| Comparative Example 3 | | | diethylene glycol dimethyl ether | 0 | could not be measured | |
| Comparative Example 4 | | | — | — | 0.38 | 0.041 |
| Comparative Example 5 | | | — | — | 0.36 | 0.034 |
| Comparative Example 6 | | | — | — | 0.35 | 0.033 |
| Example 2 | | | diethylene | 10 | 0.36 | 0.022 |
| Example 3 | | | glycol dimethyl ether | 30 | 0.35 | 0.023 |
| Example 4 | | | diethylene | 10 | 0.37 | 0.019 |
| Example 5 | | | glycol diacetate | | 0.39 | 0.025 |

| | Relative Standard Deviation of Pore Radius | Diffusion Coefficient of Adsorbed Water ($10^{-11}$ m$^2$/sec) | Time to Convergence of Diffusion Coefficient of Adsorbed Water (msec) |
|---|---|---|---|
| Comparative Example 1 | 0.117 | 4.4 | 500 |
| Example 1 | 0.060 | 5.2 | 400 |
| Comparative Example 2 | 0.094 | 5.2 | 600 |
| Comparative Example 3 | | could not be measured | |
| Comparative Example 4 | 0.109 | 5.7 | 700 |
| Comparative Example 5 | 0.099 | 5.0 | 600 |
| Comparative Example 6 | 0.095 | 4.8 | 600 |
| Example 2 | 0.061 | 4.5 | 400 |
| Example 3 | 0.066 | 4.6 | 400 |
| Example 4 | 0.051 | 4.8 | 300 |
| Example 5 | 0.064 | 4.4 | 400 |

In addition, the performance characteristics of the composite semipermeable membranes obtained in Comparative Examples 1 to 6 and Examples 1 to 5 were values listed in Table 4 for the salt removal ratio, the membrane permeation flux and the pure water permeation coefficient, respectively.

TABLE 4

| | Salt Removal Ratio (%) | Membrane Permeation Flux (m$^3$/m$^2$/d) | Pure Water Permeation Coefficient A (m/s/Pa) | A/R$^4$ (m/s/Pa/nm$^4$) |
|---|---|---|---|---|
| Comparative Example 1 | 99.88 | 1.05(5.5 MPa) | 0.44 × 10$^{-11}$ | 1.57 × 10$^{-9}$ |
| Example 1 | 99.85 | 1.89(5.5 MPa) | 0.79 × 10$^{-11}$ | 2.02 × 10$^{-9}$ |
| Comparative Example 2 | 99.25 | 1.24(0.5 MPa) | 3.11 × 10$^{-11}$ | 2.66 × 10$^{-9}$ |
| Comparative Example 3 | | could not be measured | | |
| Comparative Example 4 | 99.05 | 1.55(0.5 MPa) | 3.89 × 10$^{-11}$ | 1.87 × 10$^{-9}$ |
| Comparative Example 5 | 99.08 | 1.48(0.5 MPa) | 3.72 × 10$^{-11}$ | 2.21 × 10$^{-9}$ |
| Comparative Example 6 | 99.13 | 1.45(0.5 MPa) | 3.65 × 10$^{-11}$ | 2.43 × 10$^{-9}$ |
| Example 2 | 99.12 | 2.08(0.5 MPa) | 5.70 × 10$^{-11}$ | 3.39 × 10$^{-9}$ |
| Example 3 | 99.18 | 1.71(0.5 MPa) | 4.69 × 10$^{-11}$ | 3.12 × 10$^{-9}$ |
| Example 4 | 99.15 | 2.19(0.5 MPa) | 6.00 × 10$^{-11}$ | 3.20 × 10$^{-9}$ |
| Example 5 | 98.4 | 1.55(0.5 MPa) | 4.25 × 10$^{-11}$ | 1.83 × 10$^{-9}$ |

As shown in Table 3, it is apparent that the membranes obtained in Examples 1 to 5 have the standard deviation of the pore radius of 0.025 nm or less and the relative standard deviation of 0.089 or less. Furthermore, as shown in Table 4, it is apparent that the membranes obtained in Examples 1 to 5 exhibit the high pure water permeability coefficient while substantially maintaining the salt removal ratio for each comparative example. In Comparative Example 3, it was impossible to be measured by the positron annihilation lifetime. No permeability was shown as a membrane performance characteristic and was not able to be measured.

The composite semipermeable membrane of the present invention is especially suitable for use in desalting seawater or brackish water.

The invention claimed is:

1. A composite semipermeable membrane, comprising:
   a porous supporting membrane including a substrate and a porous support layer; and
   a separation functional layer disposed on the porous support layer,
   wherein
   the separation functional layer has an average pore radius measured by the positron annihilation lifetime measurement of 0.35 nm or more and 0.37 nm or less, the pore radius has a standard deviation of 0.023 nm or less, and
   a pure water permeability coefficient A and an average pore radius R (nm), which is measured by the positron annihilation lifetime measurement, satisfy a relationship such that $A/R^4$ is $3.12 \times 10^{-9}$ m/s/Pa/nm$^4$ to $3.39 \times 10^{-9}$ m/s/Pa/nm$^4$.

2. The composite semipermeable membrane according to claim 1, wherein the standard deviation is 0.020 nm or less.

3. The composite semipermeable membrane according to claim 1, wherein the pore radius has a relative standard deviation of 0.051 or more and 0.066 or less.

4. The composite semipermeable membrane according to claim 1, wherein a difference between a maximum pore radius and a minimum pore radius of the separation functional layer measured by the positron annihilation lifetime measurement is 0.12 nm or less.

* * * * *